(12) United States Patent
Michioka et al.

(10) Patent No.: US 7,950,304 B2
(45) Date of Patent: May 31, 2011

(54) ROLLER SCREW

(75) Inventors: Hidekazu Michioka, Tokyo (JP);
Makoto Iizumi, Tokyo (JP); Satoshi Fujita, Kyoto (JP); Akimasa Yoshida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 391 days.

(21) Appl. No.: 11/908,210

(22) PCT Filed: Mar. 2, 2006
(Under 37 CFR 1.47)

(86) PCT No.: PCT/JP2006/304007
§ 371 (c)(1),
(2), (4) Date: Apr. 10, 2009

(87) PCT Pub. No.: WO2006/095637
PCT Pub. Date: Sep. 14, 2006

(65) Prior Publication Data
US 2009/0249912 A1    Oct. 8, 2009

(30) Foreign Application Priority Data
Mar. 9, 2005  (JP) .................. 2005-065410

(51) Int. Cl.
*F16H 1/24* (2006.01)
*F16H 55/02* (2006.01)
(52) U.S. Cl. .................. 74/424.91; 74/424.81
(58) Field of Classification Search ............. 74/424.81, 74/424.82, 424.88, 424.91, 89.23
See application file for complete search history.

(56) References Cited

U.S. PATENT DOCUMENTS
3,055,230 A * 9/1962 Strassberg ............... 74/424.82
3,192,791 A * 7/1965 Greby ..................... 74/424.82
(Continued)

FOREIGN PATENT DOCUMENTS
GB  2361286 A   10/2001
JP  11-210858 A   8/1999
JP  2000-161459 A   6/2000
JP  2002-48143 A   2/2002
(Continued)

OTHER PUBLICATIONS
International Search Report of PCT/JP2006/304007, date of mailing Apr. 4, 2006.
(Continued)

*Primary Examiner* — Justin Krause
(74) *Attorney, Agent, or Firm* — Westerman, Hattori, Daniels & Adrian, LLP

(57) ABSTRACT

A roller screw of the present invention has a screw shaft 1 having a roller rolling surface 1a spirally formed with a lead on an outer surface thereof; a nut 2 having a roller rolling surface 2a spirally formed on an inner surface thereof to face the roller rolling surface 1a of the screw shaft 1; and a plurality of rollers 4 arranged in a rolling path 3 between the roller rolling surface 1a of the screw shaft 1 and the roller rolling surface 2a of the nut 2 and moving around the screw shaft while rotating on rotation axes of the rollers. In this roller screw, each of the rotation axes 4a of the rollers 4 substantially crosses a center line 1b of the screw shaft 1. Since each of the rotation axes 4a of the rollers 4 crosses the center line 1b of the screw shaft 1 (in other words, the rollers 4 arranged in the rolling path 3 are not skewed from the beginning) even when the rolling path 3 has the lead, the roller 4 are allowed to move smoothly.

8 Claims, 20 Drawing Sheets

U.S. PATENT DOCUMENTS

| | | | |
|---|---|---|---|
| 6,481,305 B2 | 11/2002 | Nishimura et al. | |
| 2001/0017062 A1 | 8/2001 | Nishimura et al. | |
| 2001/0038724 A1* | 11/2001 | Murata | 384/44 |
| 2007/0221002 A1* | 9/2007 | Pan | 74/424.82 |

FOREIGN PATENT DOCUMENTS

| | | |
|---|---|---|
| JP | 2002-48183 A | 2/2002 |
| JP | 2004-68882 A | 3/2004 |

OTHER PUBLICATIONS

International Preliminary Report on Patentability (English translation form PCT/IPEA/409) of International Application No. PCT/JP2006/304007 with an international filing date of Mar. 2, 2006.

Supplementary European Search Report dated Jan. 25, 2011, issued in corresponding European Patent Application No. 06715116.7.

* cited by examiner 3a  1a   4  4b    1   4a (A)

(B)

(A)

(B)

(C)

(D)

ROLLER SCREW

TECHNICAL FIELD

The present invention relates to a roller screw having rollers capable of rolling between a screw shaft and a nut.

BACKGROUND ART

There is known a ball screw having balls capable of rolling between a screw shaft and a nut. Such a ball screw has been in the actual use in a positioning mechanism of a machine tool/robot, a feeding mechanism, a steering gear of a vehicle and the like as it allows reduction of the friction factor in rolling the screw shaft relative to the nut, as compared with a sliding-contact type screw.

In these years, in order to increase an allowable load, there has been devised a roller screw using rollers as rolling elements instead of balls, which is disclosed in the patent document 1, for example. In such a roller screw, a screw shaft has a roller rolling surface spirally formed on the outer surface thereof and a nut also has a roller rolling surface spirally formed on the inner surface thereof to face the roller rolling surface of the screw shaft. In a rolling path formed between the roller rolling surface of the screw shaft and the roller rolling surface of the nut, there are arranged plural rollers as rolling elements. When either the screw shaft or the nut is rotated, the rollers move (revolve) around the screw shaft while rotating on their axes.

[Patent Document 1] Japanese Patent Laid-open Publication No. 11-210858

DISCLOSURE OF THE INVENTION

Problems to be Solved by the Invention

Such a roller screw as described above was devised, however, it has not yet been in the actual use. In order to put this roller screw into practical use, the inventors tried developing the roller screw based on the idea of rotary bearing using rollers as rolling elements.

In a rotary bearing, there are plural rollers arranged annularly in one plane and the rotation axes of the respective rollers are directed toward the center of an annular rolling path. Here, the roller screw can be thought of as a roller bearing with a lead. From this point of view, the roller screw was designed as the rotary bearing having a rolling path with a lead and rollers 32 were arranged in the spiral rolling path with lead.

When the idea of rotary bearing was used as a basis to design a ball screw using as rolling elements balls capable of rolling in every direction, there occurred no problem. However, when the rolling elements used were rollers capable of rolling in only one direction, there occurred a problem that the rollers did not move smoothly (or in a worse situation, the rollers were locked and could not move), which problem was unforeseen in the case of the ball screw.

FIGS. 20(A) to 20(D) illustrate the transition of the rotation axis of a roller arranged in a spiral roller rolling path with a lead (FIG. 20(A) is a perspective view of rollers in the rolling path, FIG. 20(B) is a perspective view illustrating the transition of the rotation axis, FIG. 20(C) is a front view illustrating the transition of the rotation axis and FIG. 20(D) is a side view illustrating the transition of the rotation axis). The inventors have taken note of the rotation axis of each roller arranged in the rolling path of such a problematic roller screw and found that the rotation axis 32a of the roller 32 does not cross the center line 31a of the screw shaft 31 and as the roller 32 moves, the point P on the rotation axis 32a of the roller 32 moves on a coil-shaped track with the center line 31a of the screw shaft 31 as its center. They have also found that when a lead is provided in the rolling path, the rotation axis 32a of each roller 32 does not cross the center line 31a of the screw shaft 31 (in other words, the roller is skewed from the beginning), which consequently prevents smooth movement of the roller 32.

Means for Solving the Problems

Description will now be made of the present invention. For ease in understanding the present invention, the reference numerals in accompanying drawings are added in parentheses to the following description. However, these are not for limiting the present invention to the embodiments illustrated in the drawings.

The inventors have solved the above-mentioned problems by making the rotation axis of each roller in a rolling path cross the center line of the screw shaft even when the rolling path has a lead. Specifically, a first aspect of the invention provides a roller screw having: a screw shaft (1) having a roller rolling surface (1a) spirally formed with a lead on an outer surface thereof; a nut (2) having a roller rolling surface (2a) spirally formed on an inner surface thereof to face the roller rolling surface (1a) of the screw shaft (1); and a plurality of rollers (4) arranged in a rolling path (3) between the roller rolling surface (1a) of the screw shaft (1) and the roller rolling surface (2a) of the nut (2) and moving around the screw shaft (1) while rotating on respective rotation axes of the rollers, each of the rotation axes (4a) of the rollers (4) substantially crossing a center line (1b) of the screw shaft (1), thereby solving the above-mentioned problems.

Here, the feature that the rotation axis of each roller substantially crosses the center line of the screw shaft includes a case where the rotation axis of the roller crosses the center line of the screw shaft and a case where the rotation axis of the roller is displaced from (extends off) the center line of the screw shaft slightly enough to allow smooth movement of the roller.

A second aspect of the invention is characterized in that in the roller screw according to the first aspect, the rollers (4) move around the screw shaft (1) in such a manner that an angle (θ) formed by a rotation axis (4a) of each of the rollers (4) and a normal (9) extending from a center of the roller (4) to the center line (1b) of the screw shaft (1) is kept constant.

A third aspect of the invention is characterized in that in the roller screw according to the first or second aspects, each of the rollers (4) is in contact with the roller rolling surface (1a) of the screw shaft (1) and the roller rolling surface (2a) of the nut (2) at secondary contact lines (17, 18) slightly displaced from an initial contact line (4d) in a plane including the rotation axis (4a) of the roller (4) and the center line (1b) of the screw shaft (1) so as to have the rotation axis (4a) of the roller (4) substantially cross the center line (1b) of the screw shaft (1).

A fourth aspect of the invention is characterized in that in the roller screw according to any one of the first to third aspects, each of the rollers (4) has a cylindrical shape.

A fifth aspect of the invention is characterized in that in the roller screw according to the fourth aspect, the rollers (4) are cross-arranged in the rolling path (3) in such a manner that the rotation axes (4a) of adjacent two of the rollers (4) are orthogonal to each other when seen in a moving direction of the rollers (4).

A sixth aspect of the invention is characterized in that in the roller screw according to the fourth of fifth aspects, an axial length L and an outer diameter D of each of the rollers (4) satisfy a relation of L/D<1.

A seventh aspect of the invention is characterized in that in the roller screw according to any one of the first to sixth aspects, a spacer (11) is provided between each adjacent two of the rollers (4) for supporting attitudes of the rollers (4) to make the rotation axes (4a) of the rollers (4) cross the center line (1b) of the screw shaft (1) substantially.

An eighth aspect of the invention provides a roller circulating method of a roller screw having a plurality of rollers (4) arranged in a rolling path (3) between a roller rolling surface (1a) spirally formed on an outer surface of a screw shaft (1) and a roller rolling surface (2a) spirally formed on an inner surface of a nut (2) to face the roller rolling surface (1a) of the screw shaft, the rollers (4) moving around the screw shaft (1) while rotating on respective rotation axes (4) thereof, and each of the rotation axes (4a) of the rollers substantially crossing a center line (1b) of the screw shaft (1), thereby solving the above-mentioned problems.

EFFECTS OF THE INVENTION

According to the invention of claim 1, even when the rolling path has a lead, the rotation axes of the rollers cross the center line of the screw shaft (in other words, the rollers arranged in the rolling path are not skewed from the beginning). Therefore, the rollers are allowed to move smoothly.

According to the invention of claim 2, smoother movement of the rollers is allowed.

According to the invention of claim 3, the rotation axes of the rollers can be directed toward the center line of the screw shaft.

According to the invention of claim 4, even if the rollers used are cylindrical rollers which are likely to slip and be skewed, the rollers are allowed to move smoothly.

According to the invention of claim 5, it is possible to obtain a roller screw with rollers taking loads in two axially opposite directions of the screw shaft, which roller screw is nearing practical use.

According to the invention of claim 6, it is possible to hold the rollers within the rolling path.

According to the invention of claim 7, as a spacer holds the attitudes of each adjacent two rollers in such a manner that the rotation axes of the rollers cross the center line of the screw shaft, smoother movement of the rollers is allowed.

According to the invention of claim 8, even when the rolling path has a lead, the rotation axes of the rollers cross the center line of the screw shaft (in other words, the rollers arranged in the rolling path are not skewed from the beginning). Therefore, smooth movement of the rollers is allowed.

Figure 1:
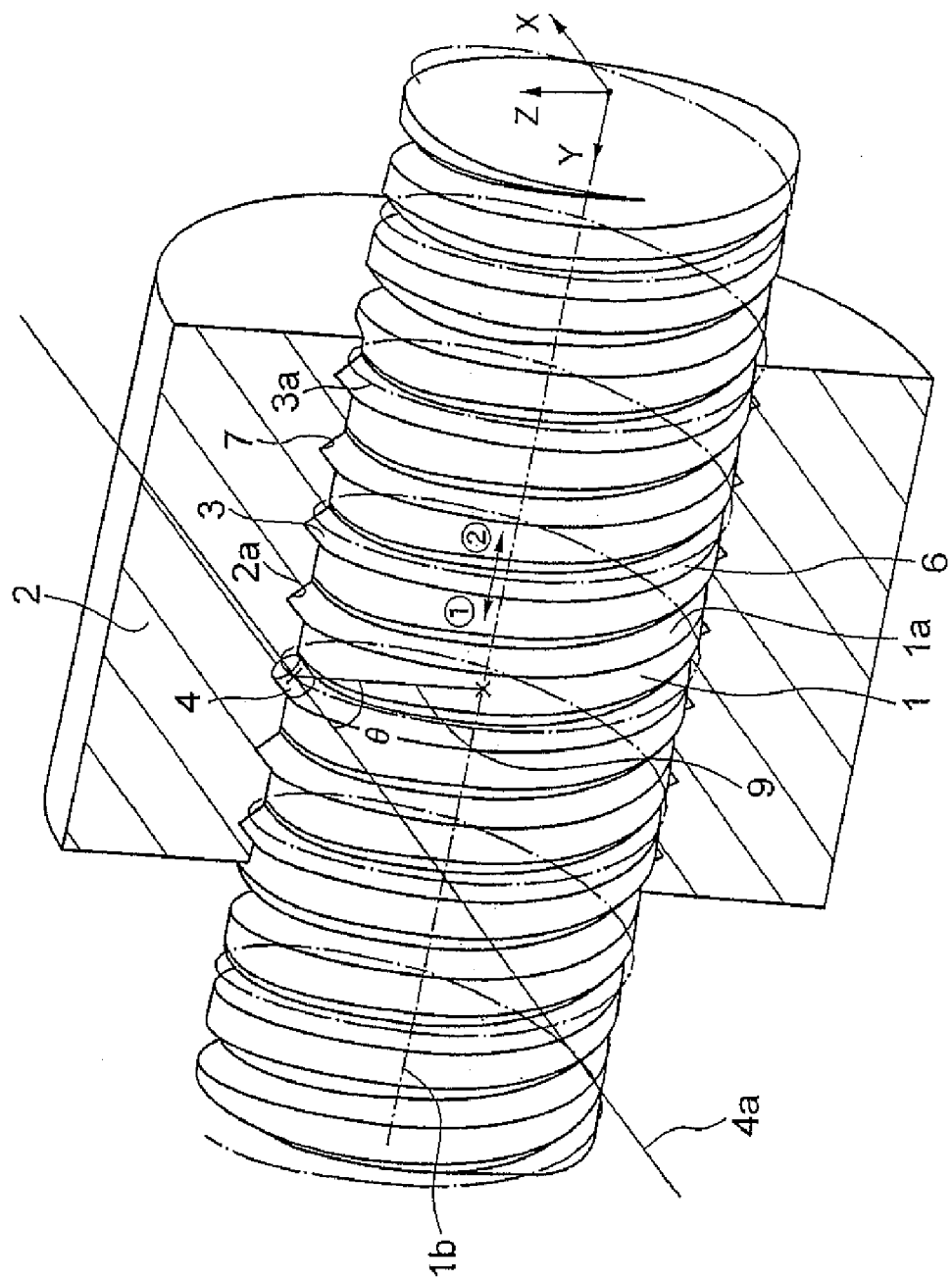
FIG. 1 is a perspective view of a roller screw according to an embodiment of the present invention (with a nut taken in cross section).
Figure 2:
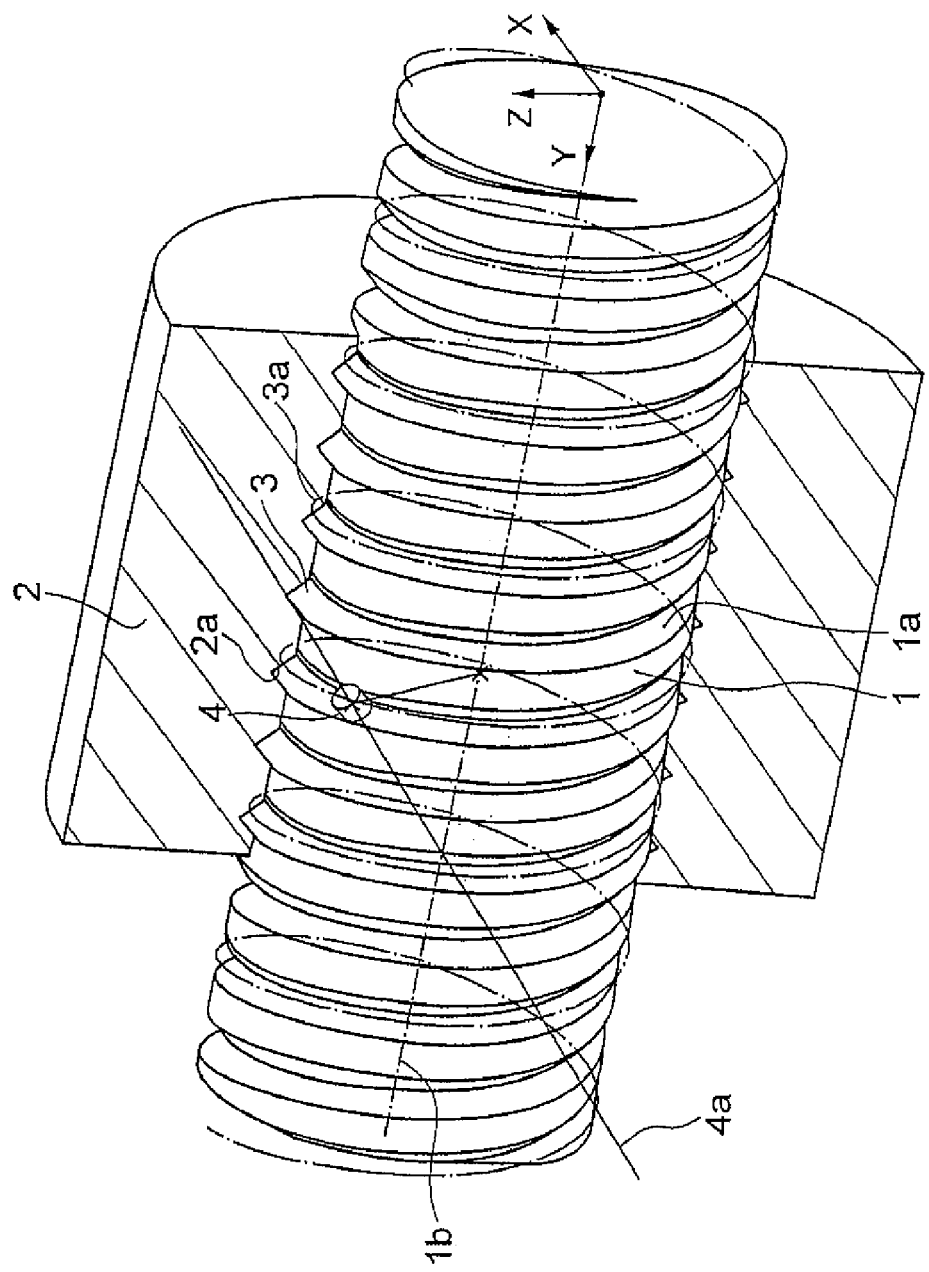
FIG. 2 is a perspective view of the roller screw with the roller at a different position.
Figure 3:
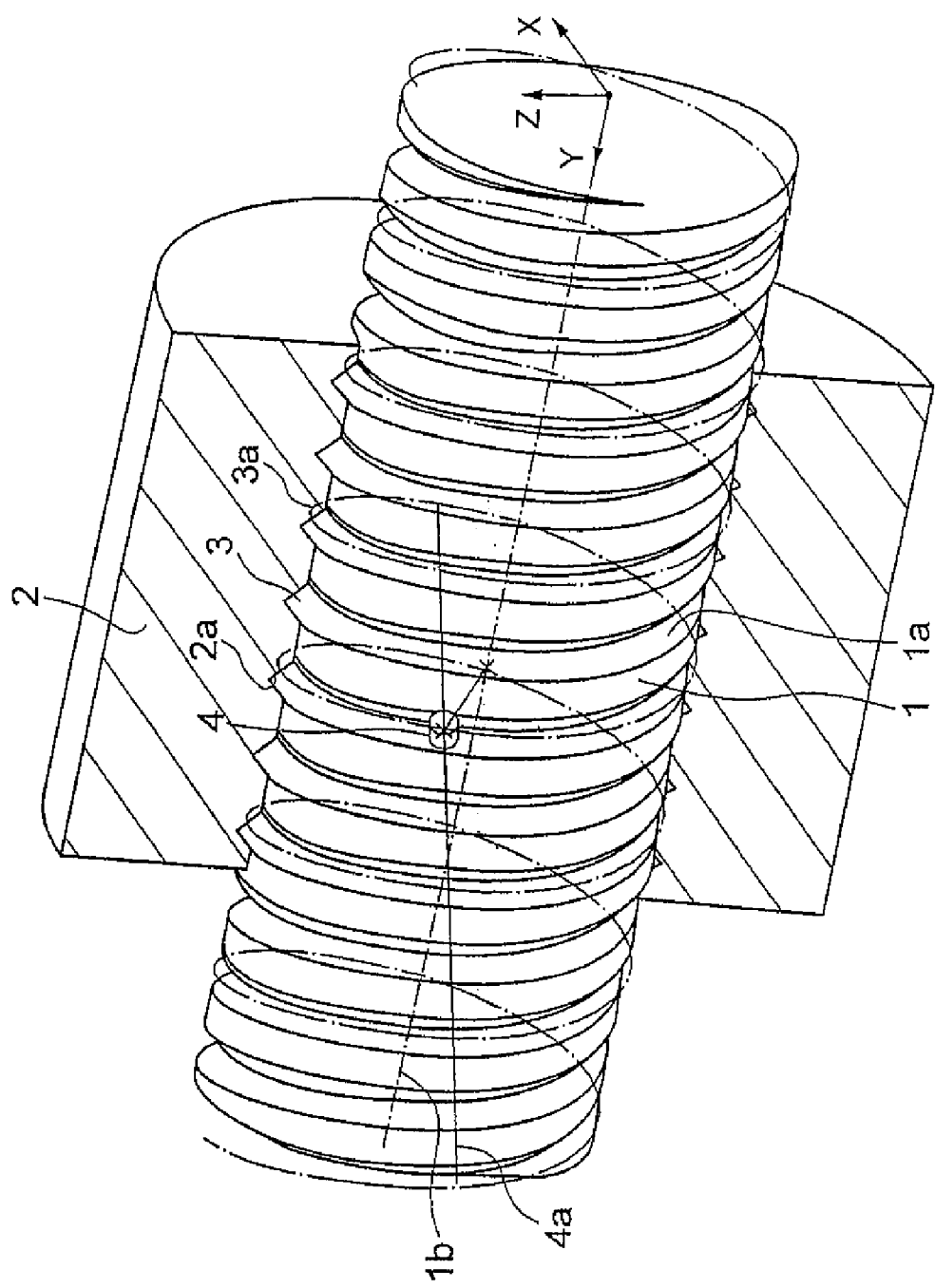
FIG. 3 is a perspective view of the roller screw with the roller at another different position.
Figure 4:
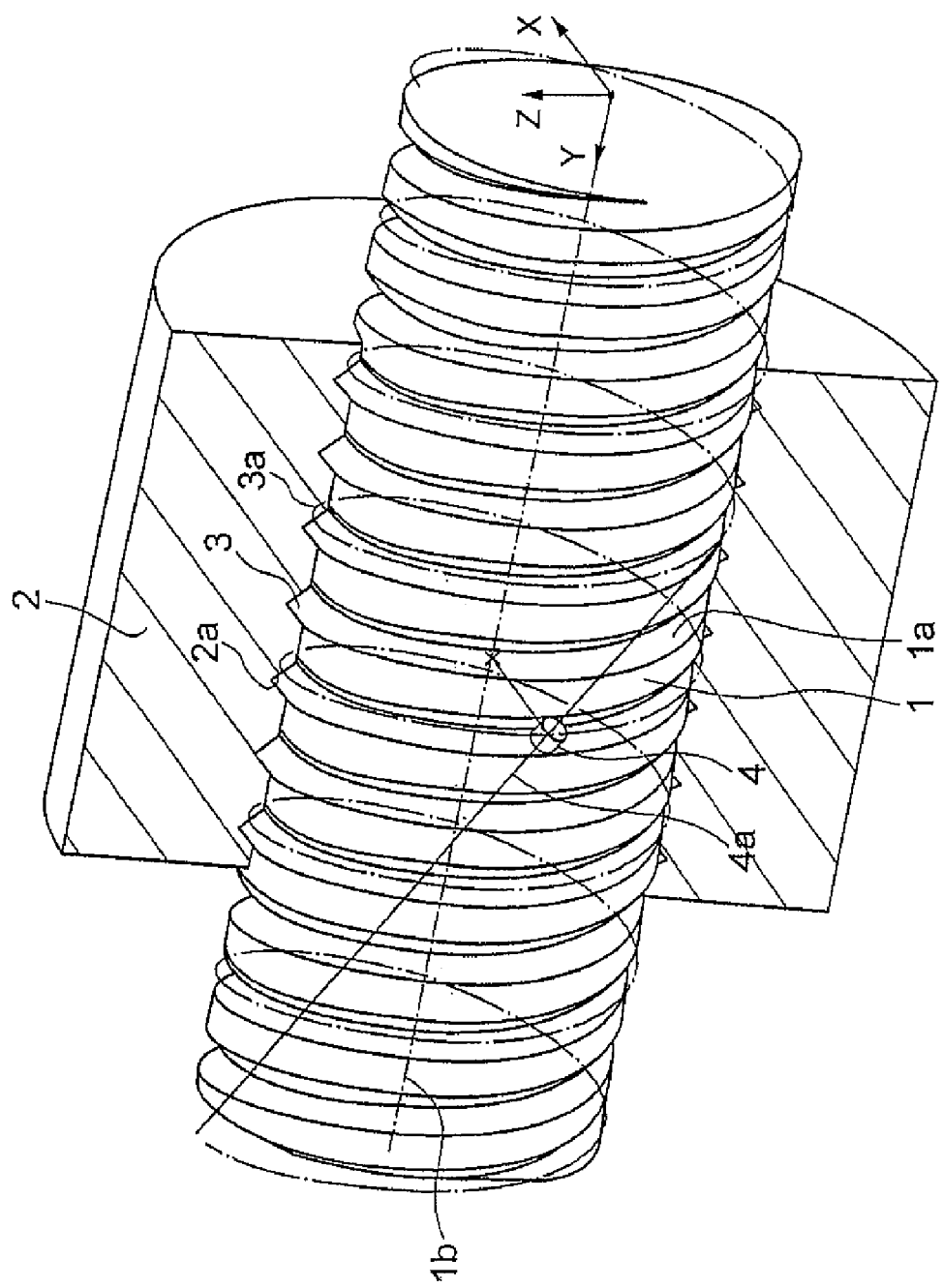
FIG. 4 is a perspective view of the roller screw with the roller at yet another different position.
Figure 5:
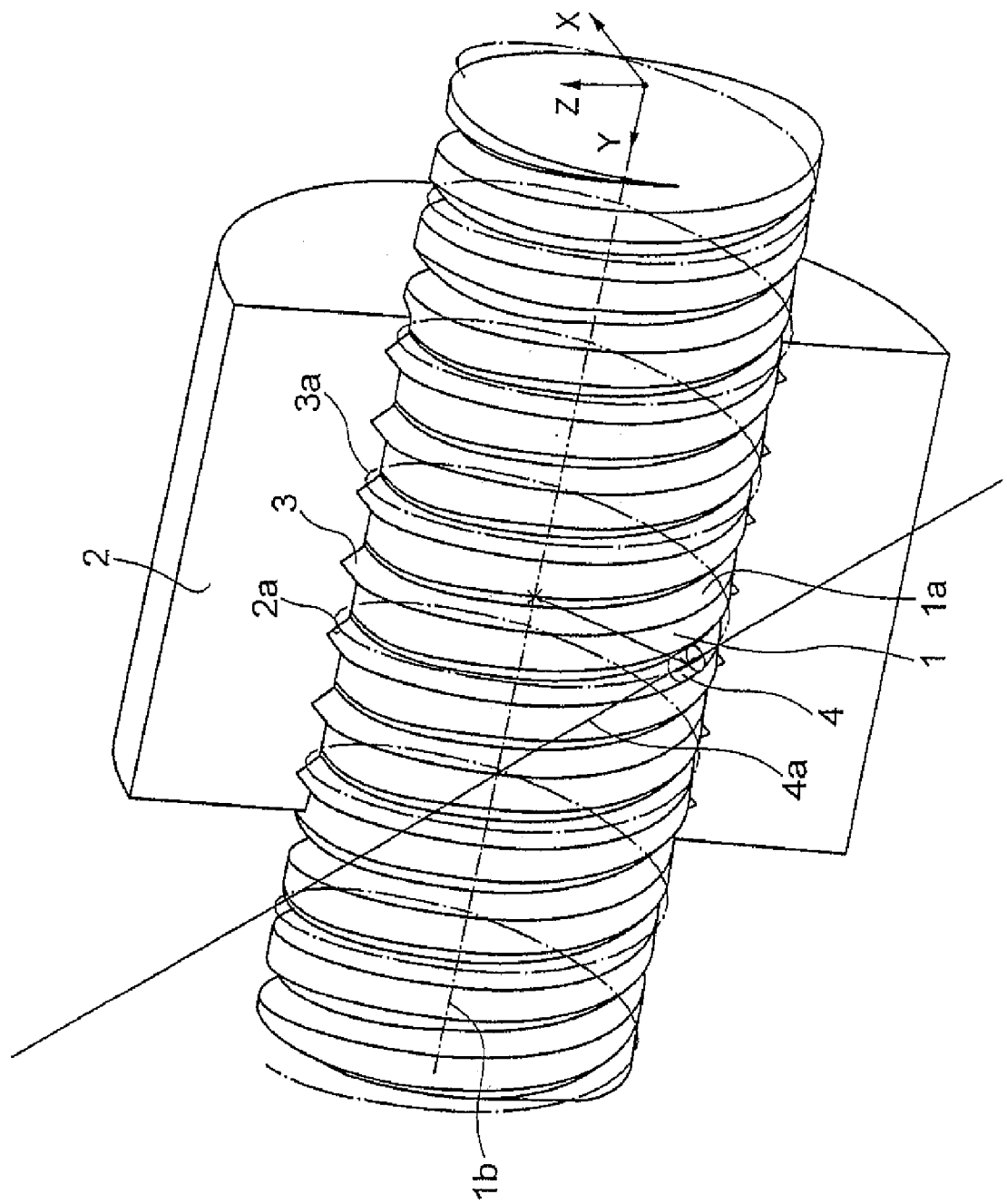
FIG. 5 is a perspective view of the roller screw with the roller at yet another different position.

DESCRIPTION OF REFERENCE NUMERALS 1 screw shaft
1a roller rolling surface
2 nut
2a roller rolling surface
3 rolling path
4 roller
4a rotation axis
4d initial contact line
9 normal
11 spacer
17, 18 secondary contact line

BEST MODE FOR CARRYING OUT THE INVENTION

With reference to the attached drawings, a roller screw according to an embodiment of the present invention will be described in detail below. In each figure, identical mechanical elements are indicated by identical reference numerals.

FIGS. 1 to 5 are perspective views of a roller screw (including a nut taken in cross section). A roller screw has a screw shaft 1 having a roller rolling surface 1a spirally formed on its outer surface, and a nut 2 having a roller rolling surface 2a spirally formed on its inner surface. The roller rolling surface 1a of the screw shaft 1 and the roller rolling surface 2a of the nut 2 face each other, and between these roller rolling surfaces 1a and 2a there is formed a spiral rolling path 3. Here, a center line 3a of the spiral rolling path 3 is indicated by a dash-dotted line.

The rolling path 3 accommodates a plurality of rollers 4 to allow them to roll therein (FIGS. 1 to 5o illustrate only one roller 4 for illustration of the movement of the roller). When the screw shaft 1 is rotated relative to the nut 2, the nut 2 moves relatively and linearly in the axial direction of the screw shaft 1 by a lead provided in the roller rolling surfaces 1a and 2a of the screw shaft 1 and the nut 2, respectively. As the roller rolling surfaces 1a and 2a of the screw shaft 1 and the nut 2 are in line contact with the roller 4, it is possible to increase an allowable load on the roller screw as compared with a point-contact type ball screw.

Figure 6:
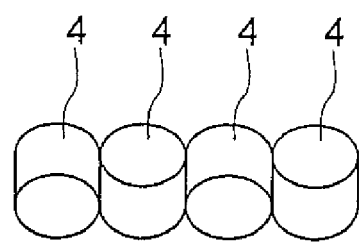
FIG. 6 is a perspective view illustrating cross-arranged rollers.

On the outer surface of the screw shaft 1, there is formed a spiral groove 6 of V-shaped cross section which constitutes the roller rolling surface 1a. On the inner surface of the nut 2, there is also formed a spiral groove 7 of V-shaped cross section which constitutes the roller rolling surface 2a. The grooves 6 and 7 of V-shaped cross section of the screw shaft 1 and the nut 2 makeup the rolling path 3 of square cross section. Cylindrical rollers 4 are held in this rolling path 3. Each roller 4 has its outer surfaces sandwiched between a wall surface of the groove 6 (roller rolling surface 1a) of the screw shaft 1 and a wall surface of the groove 7 (roller rolling surface 2a) of the nut 2 facing the wall surface of the groove 6. In this embodiment, the plural rollers 4 are cross-arranged in such a manner that each adjacent two of the rollers have axial lines orthogonal to each other (see FIG. 6). As the rollers are cross-arranged, they are able to take loads in both directions of one direction (1) and the other (2) along the center line of the screw shaft 1. Here, the rollers 4 under a load in the direction (1) and the rollers 4 under a load in the other direction (2) may be equal in number, or if the allowable loads in the two directions are to be differentiated, the number of the rollers 4 under a load in the direction (1) and the number of the rollers 4 under a load in the other direction (2) may be differentiated.

Each roller 4 revolves around the screw shaft 1 while rotating on its axis. An essential feature of the present invention is that when the roller 4 revolves around the screw shaft 1 while rotating on its axis, the rotation axis of the roller 4 crosses the center line of the screw shaft 1 as illustrated in FIGS. 1 to 5. Even if the position of the roller 4 varies from FIG. 1 to FIG. 5, the rotation axis 4a of the roller 4 always crosses the center line 1b of the screw shaft 1. The center line 1b of the screw shaft 1 coincides with the center line of revolution orbit of the roller 4. Besides, the roller 4 revolves around the screw shaft 1 while keeping an angle θ formed by the rotation axis 4a and the normal 9 extending from the center of the roller 4 to the center line 1b of the screw shaft 1 constant, or constant at 45° in this embodiment. For this reason, the angle formed by the center line of the screw shaft 1 and the rotation axis of the roller 4 is also kept constant at 45°.

Figure 7:
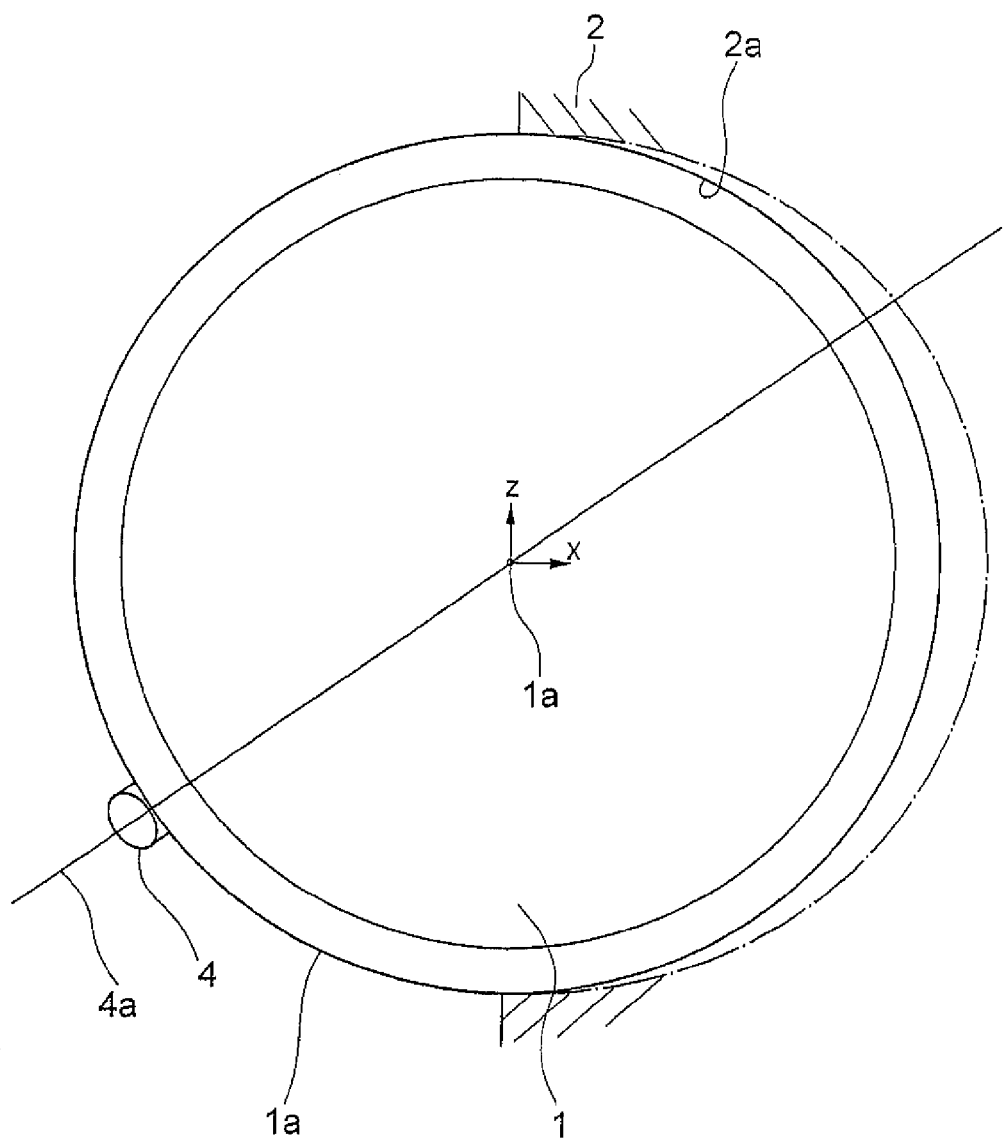
FIG. 7 is a view of a roller screw looking in the axial direction of the screw shaft.

FIG. 7 illustrates a roller screw seen in the axial direction of the screw shaft 1. No matter where the roller 4 is positioned around the screw shaft 1, the rotation axis 4a of the roller 4 crosses the center line 1b of the screw shaft 1. Although one roller 4 is only shown in this figure, the rotation axes 4a of all rollers 4 revolving around the screw shaft 1 cross the center line 1b of the screw shaft. Conversely, the rotation axes 4a of the plural rollers 4 extend in all directions from the center line 1b of the screw shaft 1.

Figure 8:
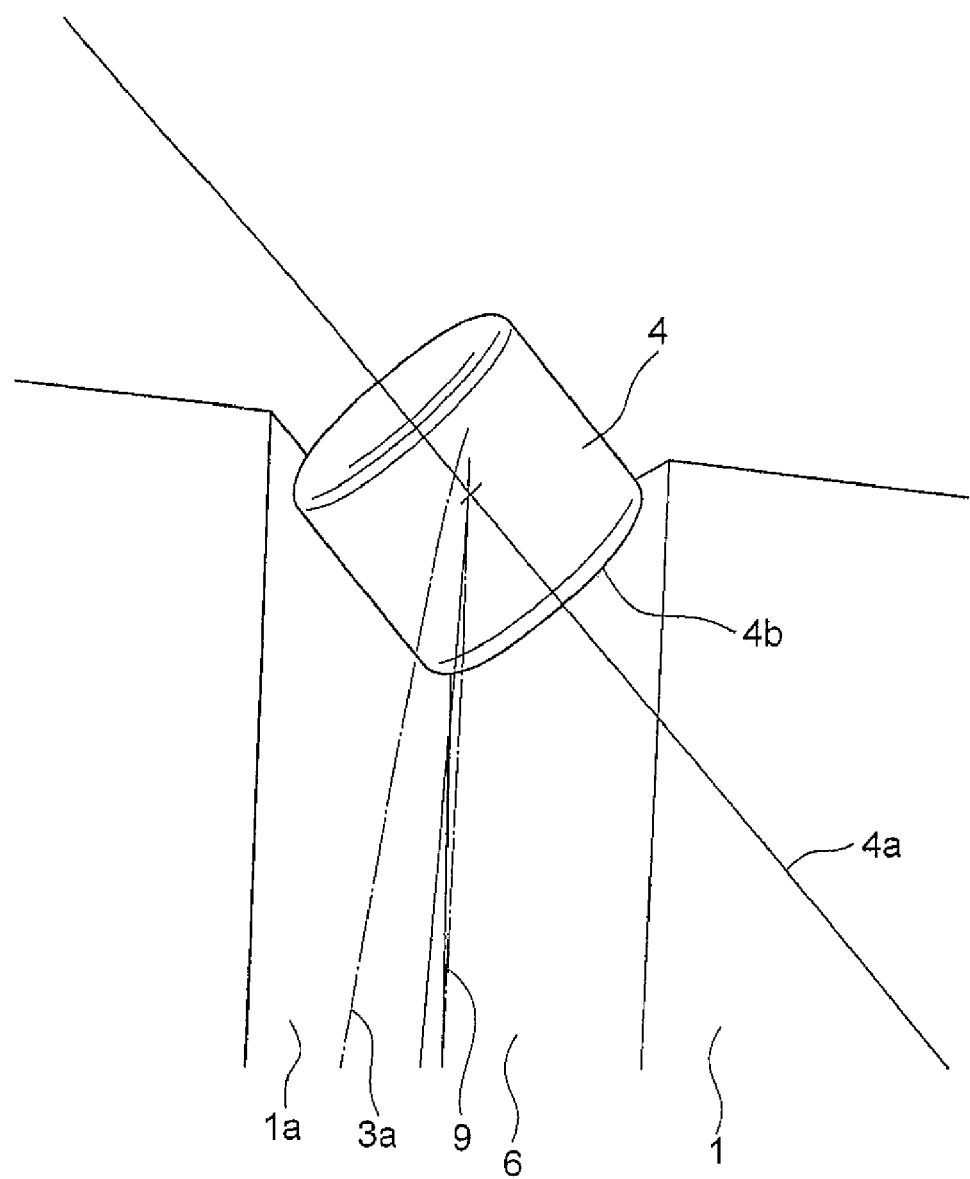
FIG. 8 is a detailed view of a roller rolling on a roller rolling surface of the screw shaft.
Figure 9:
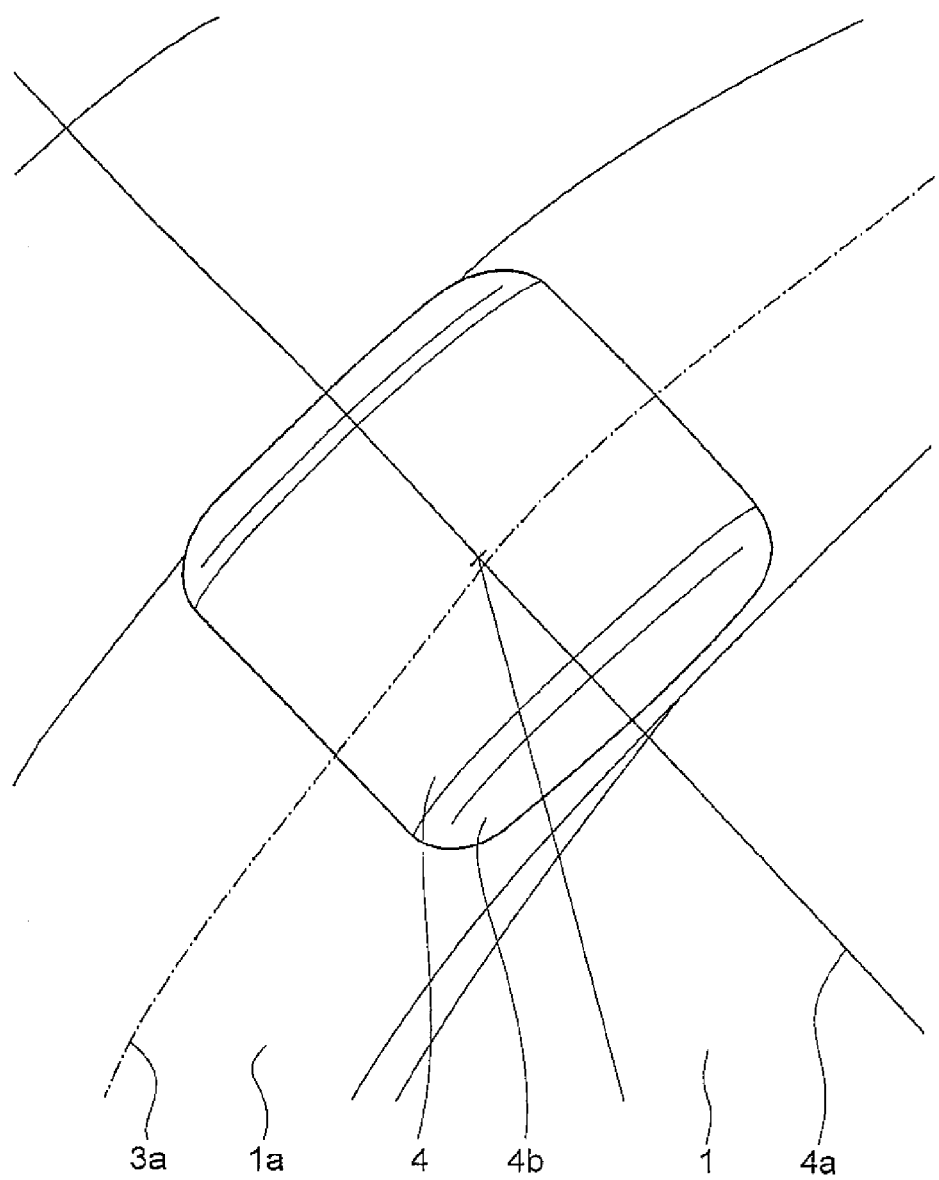
FIG. 9 is a detailed view of a roller rolling on the roller rolling surface of the screw shaft.

FIGS. 8 and 9 are detailed views each illustrating a roller 4 rolling on the roller rolling surface 1a of the screw shaft 1. The roller 4 rolls on the roller rolling surface 1a which is a one-side wall surface of the groove 6 of v-shaped cross section. When the roller 4 rolls on the roller rolling surface 1a, a side surface 4b of the roller 4 comes in contact with the other-side wall surface 1c of the groove 6 and thereby the attitude of the roller 4 varies gradually. Even if the position of the roller 4 varies, the rotation axis 4a of the roller 4 extends toward the center line 1b of the screw shaft 1.

Figure 10:
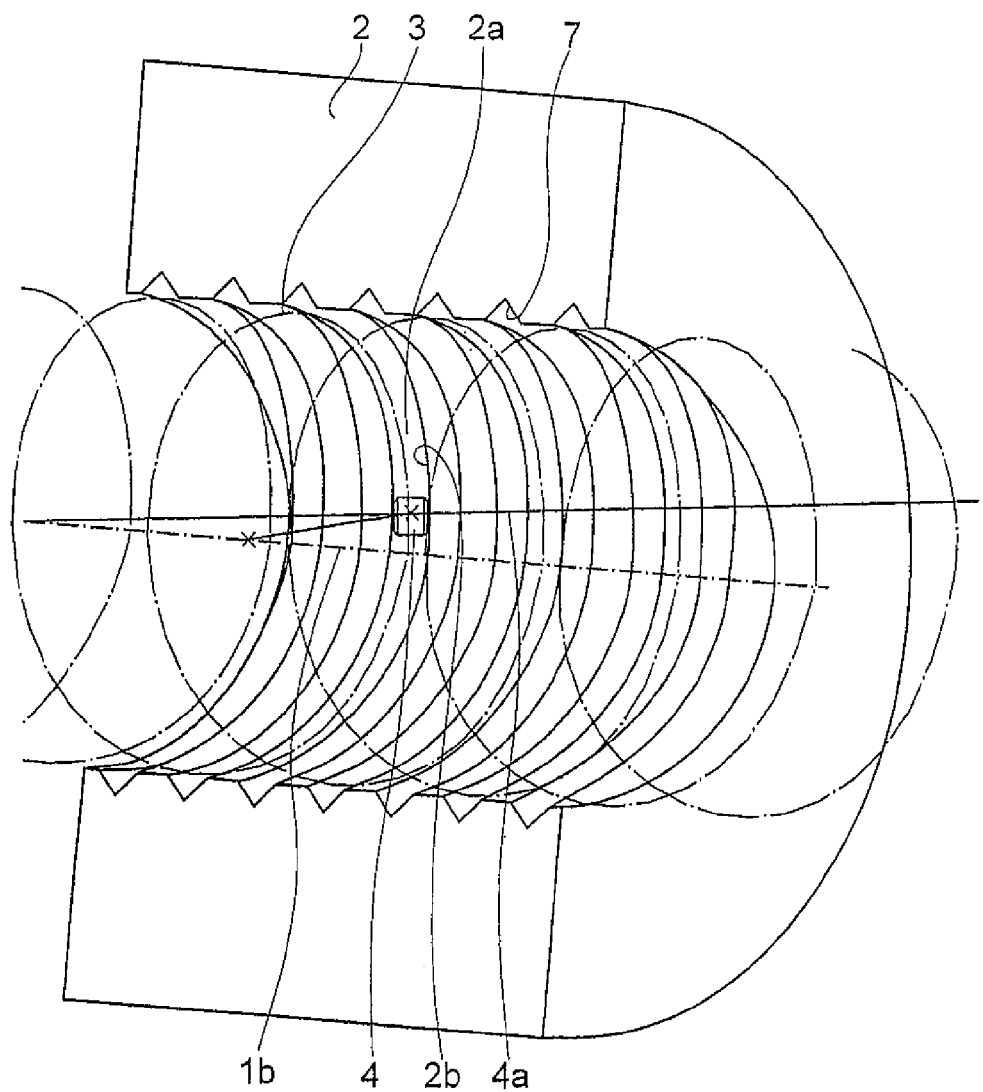
FIG. 10 is a detailed view of a roller rolling on a roller rolling surface of the nut.
Figure 11:
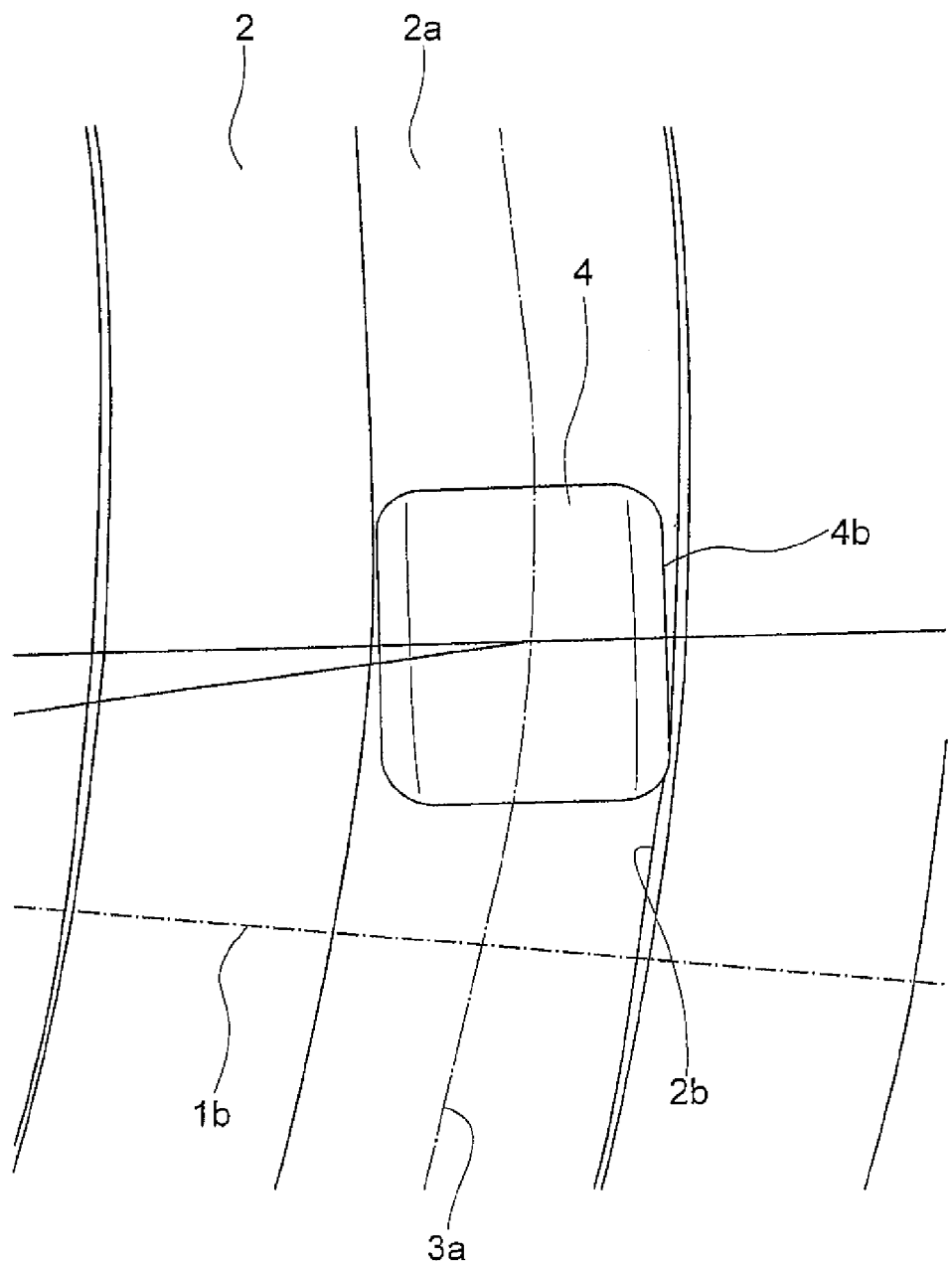
FIG. 11 is a detailed view of a roller rolling on the roller rolling surface of the nut.

FIGS. 10 and 11 are detailed views each illustrating a roller 4 rolling on the roller rolling surface 2a of the nut 2. Likewise, the roller 4 rolls on the roller rolling surface 2a which is a one-side wall surface of the groove 7 of v-shaped cross section. When the roller 4 rolls on the roller rolling surface 2a, the side surface 4b of the roller 4 comes in contact with the other-side wall surface 2b of the groove 7 and thereby the attitude of the roller 4 varies gradually so that the rotation axis 4a of the roller 4 extends toward the center line 1b of the screw shaft 1.

As seen from FIG. 11, the ratio of the axial length L to the diameter D of the roller 4 meets L/D<1. This is for preventing the side surface 4b of the roller 4 from interfering with the wall surface of the rolling path 3, as is the case with a roller held in an annular rolling path of the rotary bearing. The L/D value also depends on a lead of the screw shaft 1. As the lead of the screw shaft 1 is larger, the L/D value needs to be smaller.

Figure 12:
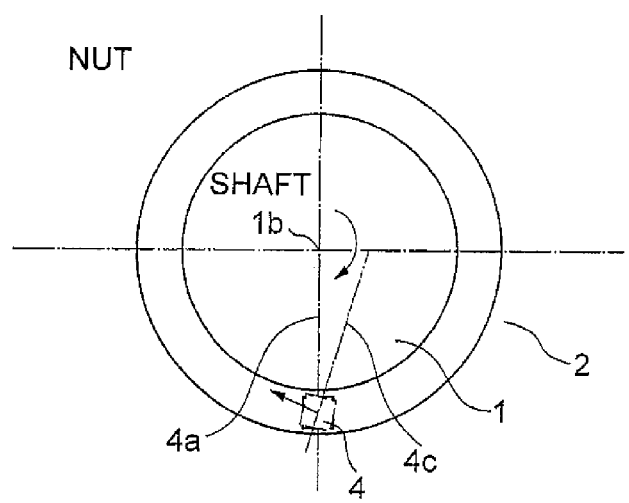
FIG. 12 is a conceptual view of a roller moving between the screw shaft and the nut.

FIG. 12 is a conceptual view of a roller 4 rolling between the screw shaft 1 and the nut 2 (view seen in the direction of the center line of the screw shaft). In the figure, the broken line indicates a roller 4 arranged in a conventional way and the solid line hidden behind the broken line indicates a roller arranged according to the present invention. The roller 4 indicated by the solid line has its rotation axis 4a crossing the center line 1b of the screw shaft 1 (in other words, the roller 4 arranged in the rolling path 3 is not skewed from the beginning) and therefore, the roller 4 is allowed to move smoothly. On the other hand, the roller 4 indicated by the broken line has its rotation axis 4c not extending toward the center line 1b of the screw shaft 1 and therefore, the roller 4 is arranged while being skewed from the beginning. With this arrangement, if the roller 4 moves in the direction of the arrow, the roller 4 comes into collision with the wall surfaces of the screw shaft 1 and the nut 2, which results in application of a large load on the roller 4.

Figure 13:
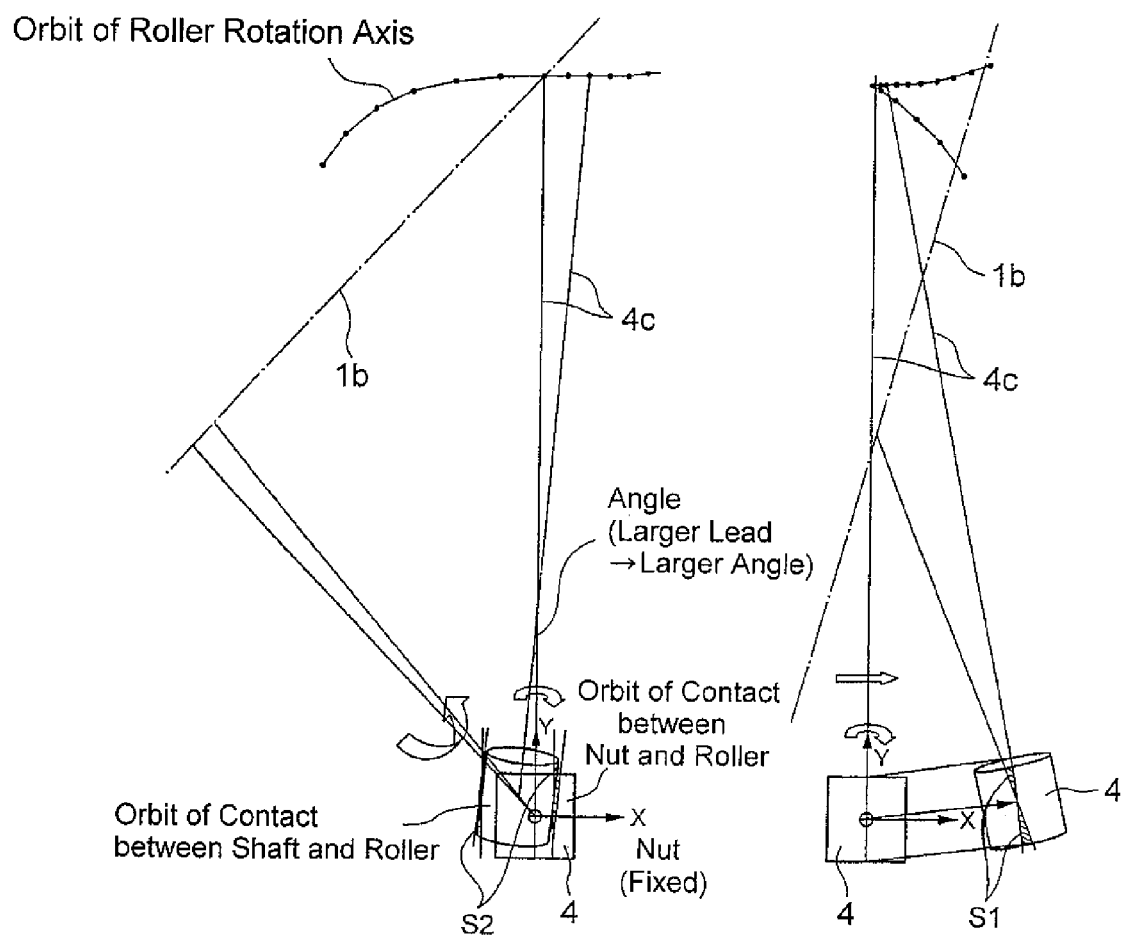
FIG. 13 is a view illustrating slips of rollers arranged in the conventional way.

FIG. 13 illustrates slips caused in a roller 4 arranged in the conventional way. Slips caused in the roller 4 are separated into one slip S1 which is caused similarly in the rotary bearing and the other slip S2 which is caused by a lead angle. The slip S1 caused like in the rotary bearing results from a circumference difference between the inner side and the outer side. An amount of slip S1 depends on a relation between the size of the roller 4 and the RCD of the roller 4. As the RCD is larger relative to the length of the roller 4, the slip amount becomes smaller, while as the RCD is smaller, the slip amount becomes larger.

When the roller 4 is formed to have the rotation axis 4a crossing the center line 1b of the screw shaft 1 like in this embodiment, the slip S2 due to a lead angle is prevented from causing skew though the slip itself remains to occur. On the other hand, the slip S1 like in the rotary bearing also remains and is hard to remove completely as it is caused by a circumference difference between the inner side and the outer side.

Next description is made about a design method of the roller rolling surface 1a of the screw shaft 1 and the roller rolling surface 2a of the nut 2.

Figure 14:
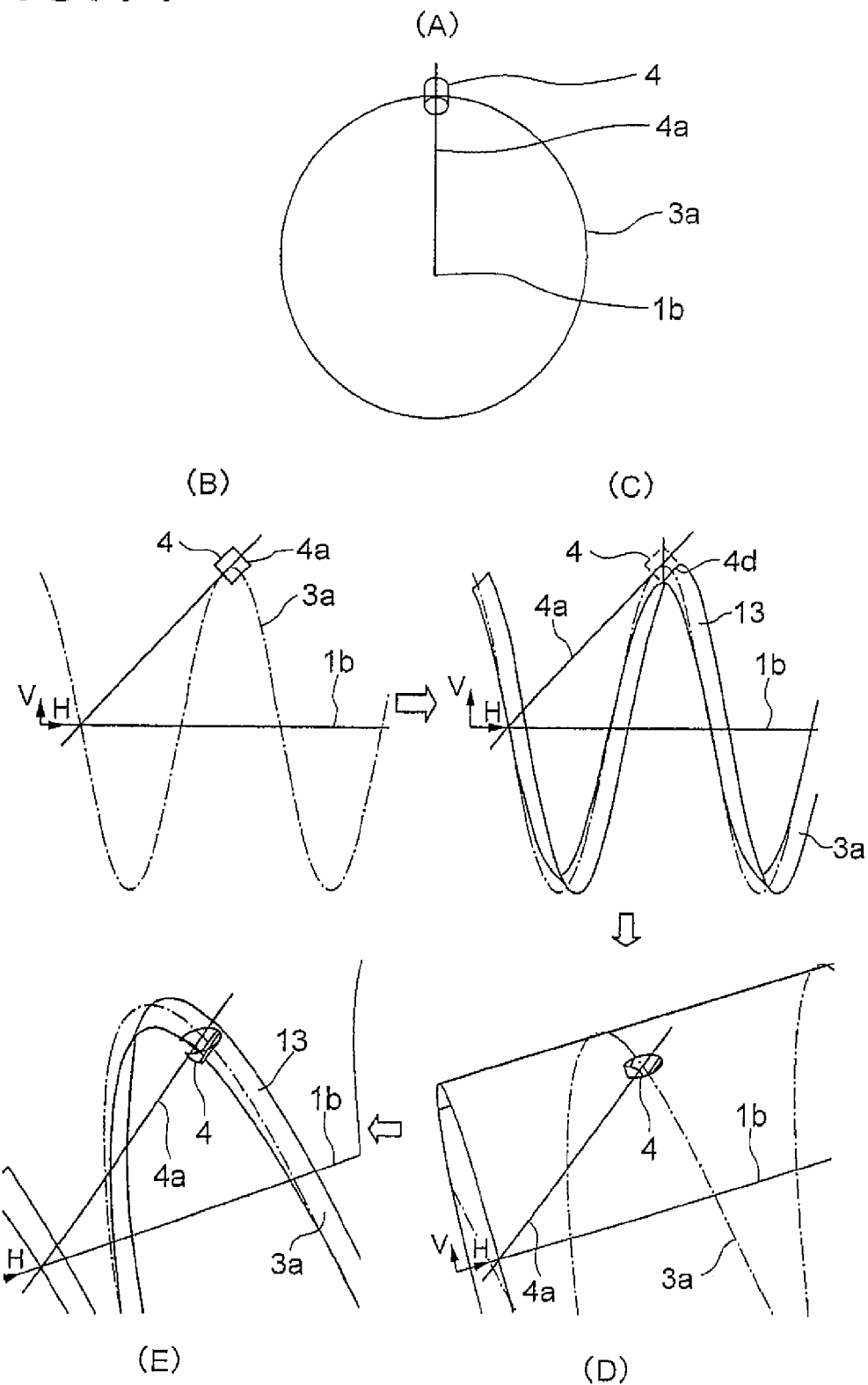
FIGS. 14(A) to 14(E) are views each illustrating a design method of a roller rolling surface.
Figure 15:
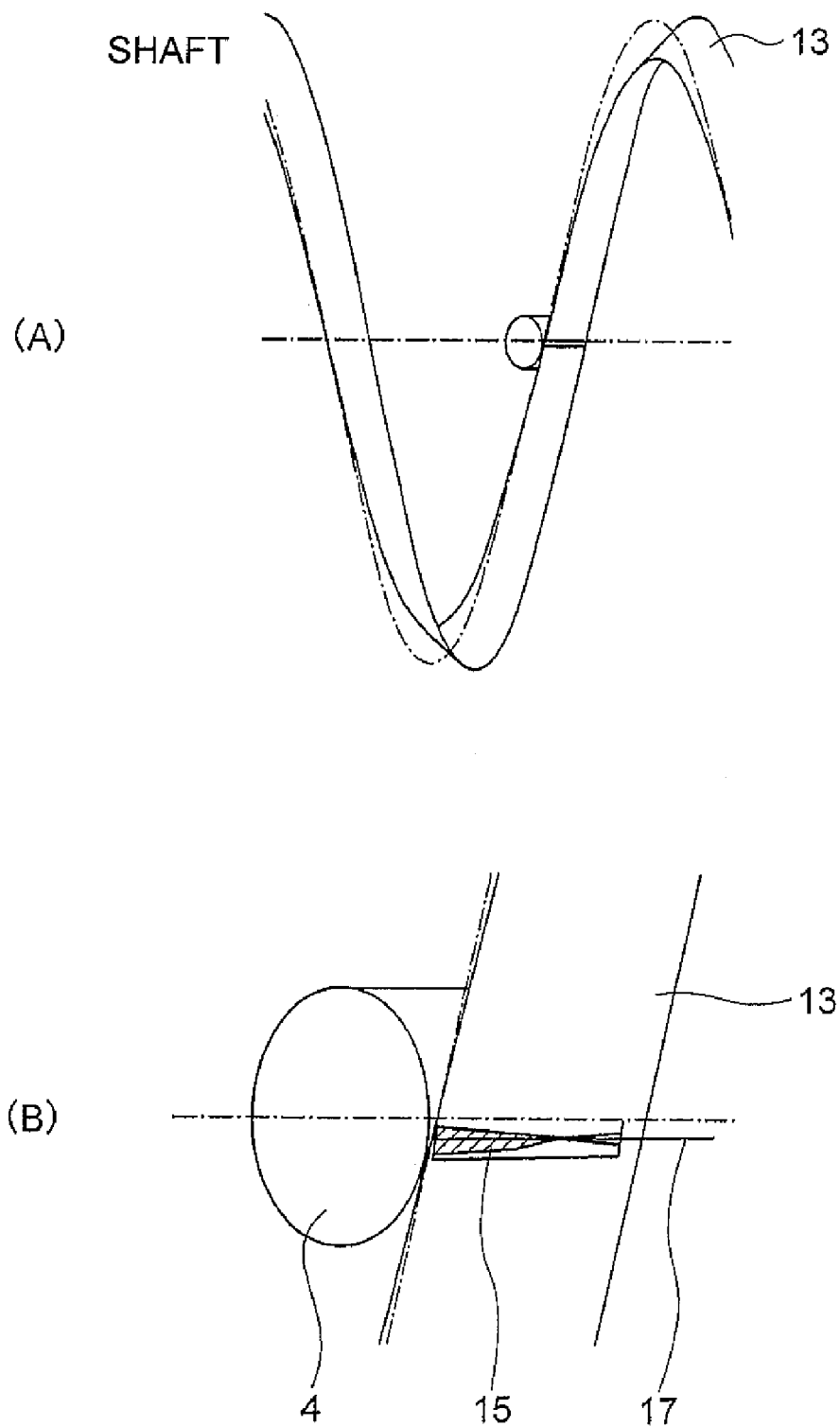
FIGS. 15(A) and 15(B) are views each illustrating a design method of the roller rolling surface of the screw shaft.

First, as illustrated in FIGS. 14(A) and 14(B), the rotation axis 4a of the roller 4 is directed toward the center line 1b of the screw shaft 1 and an angle formed by the rotation axis 4a of the roller 4 and the center line 1b of the screw shaft 1 is set to 45°. Then, as illustrated in FIG. 14(C), the roller is cut along the cross section including the rotation axis 4a of the roller 4 and the center line 1b of the screw shaft 1 to obtain an initial contact line 4d of the roller 4 in the cross section. This initial contact line 4d is developed (i.e., swept) spirally in the three-dimensional space to obtain a band-type initial contact surface 13 of the screw shaft as illustrated in FIG. 14(C). FIG. 15(A) illustrates the initial contact surface 13 of the screw shaft 1 and FIG. 16(A) illustrates an initial surface 14 of the nut 2 obtained likewise.

Next, as illustrated in FIGS. 14(D) and 14(E) the roller 4 is arranged again on the initial contact surface 13 of the screw shaft 1 in such a manner that the rotation axis 4a of the roller 4 crosses the center line 1b of the screw shaft 1 and the angle formed by the rotation axis 4a of the roller 4 and the center line 1b of the screw shaft 1 is 45°. Then, as the initial contact surface 13 of the screw shaft 1 has a lead, the roller 4 comes into contact or interferes with the initial contact surface of the screw shaft 1 at the position slightly displaced from the aforementioned initial contact line 4d.

Figure 16:
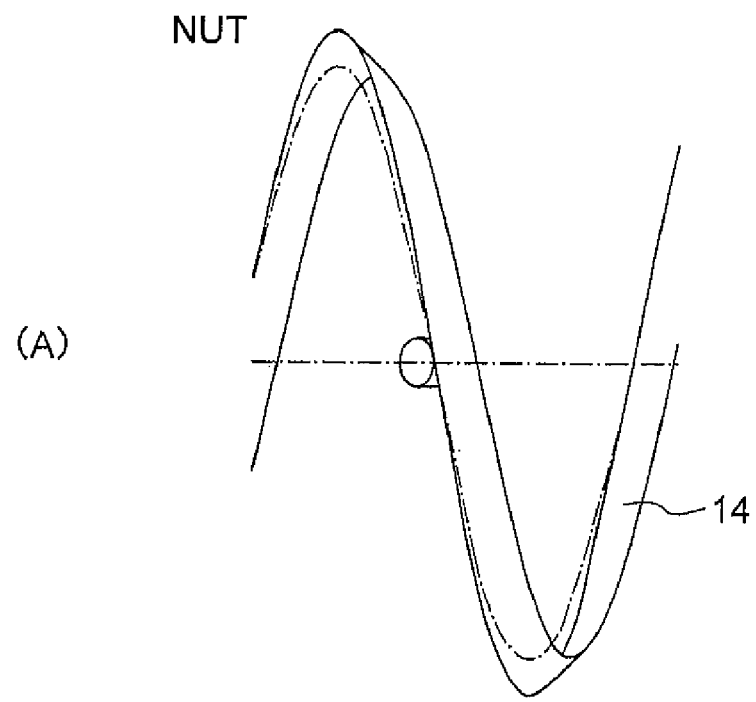
FIGS. 16(A) and 16(B) are views each illustrating a design method of the roller rolling surface of the nut.
Figure 16:
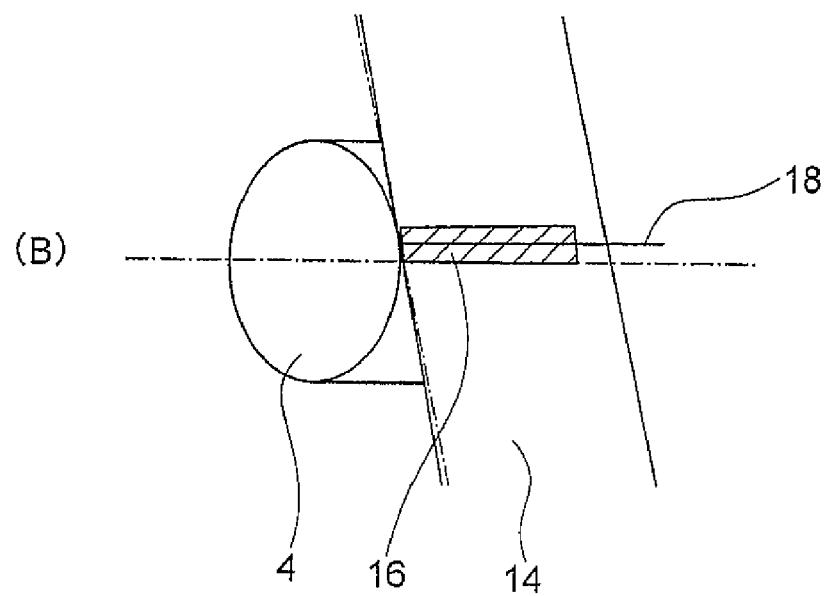

FIG. 15(B) illustrates a portion 15 where the roller 4 interferes with the initial contact surface 13 of the screw shaft 1, and FIG. 16(B) illustrates a portion 16 where the roller 4 interferes with the initial contact surface 14 of the nut 2. The portions 15 and 16 of the screw shaft 1 and the nut 2, respectively, are differently shaped because the roller 4 is into contact with the screw shaft 1 in such a manner that a large circle and a small circle are in contact at their outer surfaces, while the roller 4 is in contact with the nut 2 in such a manner that the outer surface of a small circle is in contact with the inner surface of a large circle. As illustrated in FIGS. 15(B) and 16(B), the interference portions are shaped like rectangle and hourglass on three dimensional CAD, however, from eye observation, they are seen like lines.

Next, it is assumed that the portions of the largest interference are secondary contact lines 17 and 18, and their positions are specified. The specified secondary contact line 17 and 18 are developed spirally in the three dimensional space like interference grinding. Thus, designing of the roller rolling surfaces 1a and 2a of the screw shaft 1 and the nut 2 are completed. The rotation axis 4a of the roller 4 arranged between the designed roller rolling surfaces 1a and 2a crosses the center line 1b of the screw shaft 1. Besides, the roller 4 is in contact with the roller rolling surfaces 1a and 2a of the screw shaft 1 and the nut 2 at the positions of secondary contact lines 17 and 18, respectively.

Next description is made about an example of the machining method of each roller rolling surface (1a, 2a) as designed above. For example, a grinding stone of diameter equal to that of a roller is used and arranged to have its center line crossing the center line of the screw shaft. The grinding stone is used to grind the roller rolling surface. Then, the roller rolling surface of complex or multiple shapes described above is completed. Or, instead of grinding, the roller rolling surface may be machined by cutting or rolling into a rough-shape surface, subjecting the surface to heat treatment before cutting the surface into the above-described multiple-shape surface by a hard metal chip and finally, finishing the surface by finisher.

Figure 17:
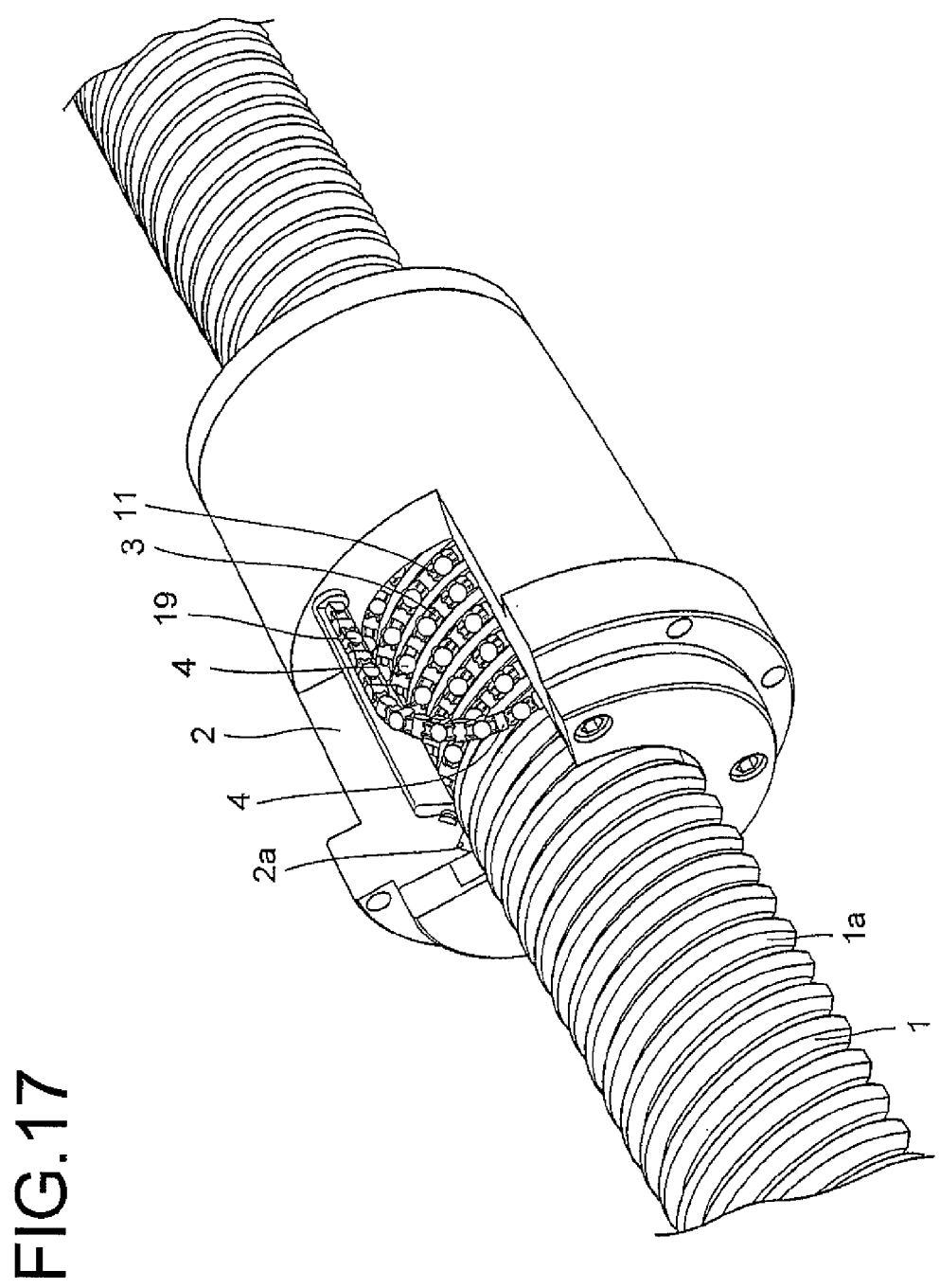
FIG. 17 is a perspective view of a roller screw provided with a circulation path (end cap type).
Figure 18:
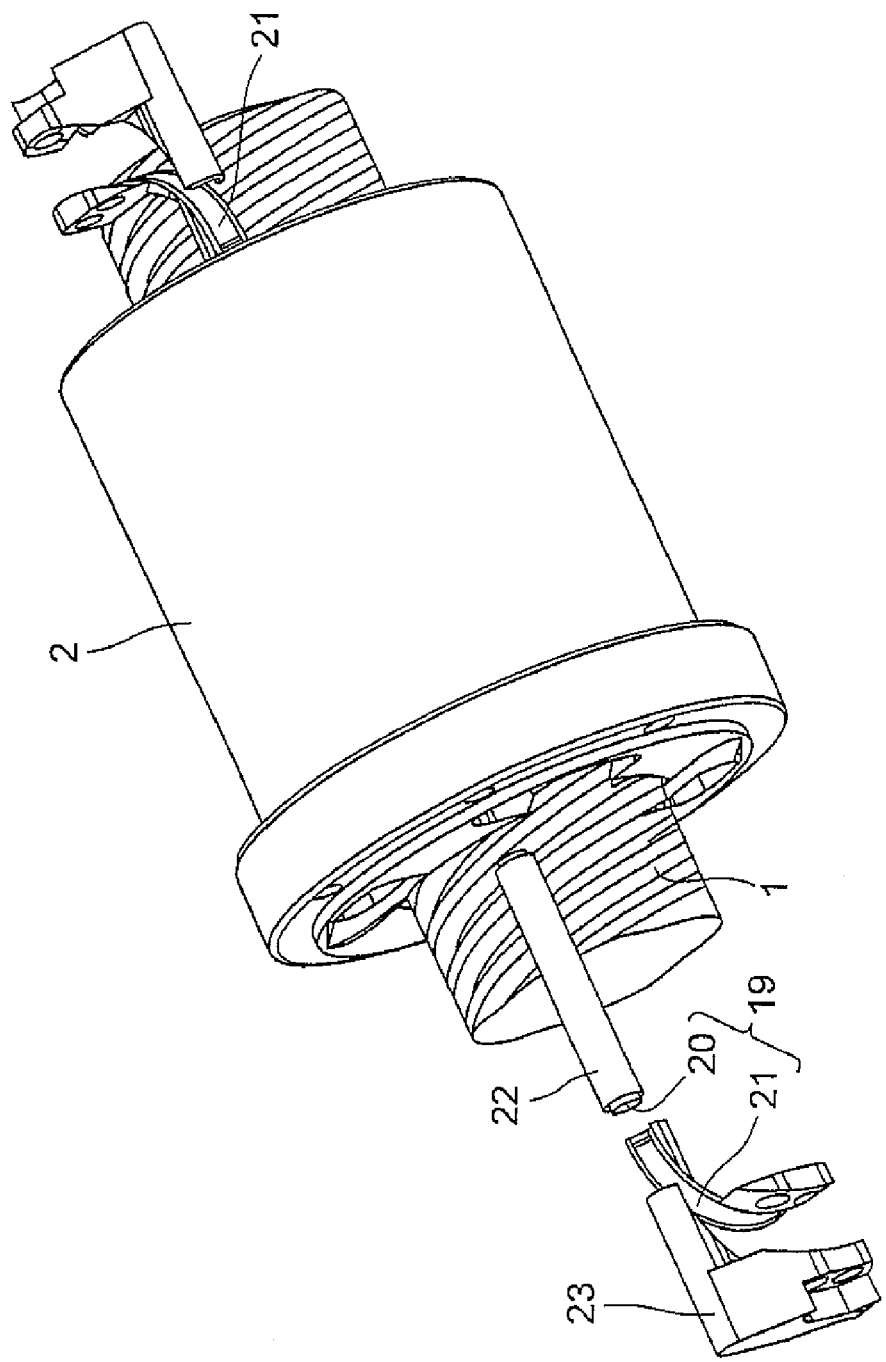
FIG. 18 is a perspective view of a roller screw provided with a circulation path (end cap type).

FIGS. 17 and 18 illustrate an example of a roller screw according to the above-described embodiment which is provided with a circulation path. In this example, an unloaded return path 19 is provided to return rollers 4 on the rolling path 3. After a roller 4 rolls from one end of the rolling path 3 to the other, the roller 4 moves along the unloaded return path 19 and returns several windings backward to the one end of the rolling path 3.

As illustrated in FIG. 18, the unloaded return path 19 includes a straight-line path 20 at the central part and direction change paths 21 at both ends. In the nut 2, a through hole is formed extending in parallel with the center line 1b of the screw shaft 1, and inserted into this through hole is a pipe-shaped straight-line portion 22. In this straight-line portion 22 the straight-line path 20 is formed having a straight track and a box-shaped cross section. The straight-line path 20 extends straight and in parallel with the center line 1b of the screw shaft 1. Each direction change path 21 extends in a curved or circular arc form.

At each of end faces in the axial direction of the nut 2, there is provided a direction change path component 23. In the direction change path component 23 the direction change path 21 is formed having a circular arc track and a box-shaped cross section. The direction change path component 23 is divided into an inner side component and an outer side component along the diagonal line of the box-shaped section of the direction change path 21.

As illustrated in FIG. 17, there is provided a spacer 11 between each adjacent two rollers 4 to hold the attitude of each roller 4 in such a manner that the rotation axis of the roller 4 crosses the center line of the screw shaft. At each end in the moving direction of the spacer 11, a curved concave portion is formed to conform to the outer shape of the roller 4. The curved concave portion is kept in contact with the outer surface of the roller 4 thereby to hold the roller 4 in a predetermined attitude. As the spacer 11 is provided, it is possible to change the attitude of the roller 4 rolling on the roller rolling surface 1a, 2a without bringing the side surface 4b of the roller 4 into contact with the wall surfaces 1c and 2b of the grooves 6 and 7 of the screw shaft 1 and the nut 2, respectively (see FIGS. 8 and 11).

Figure 19:
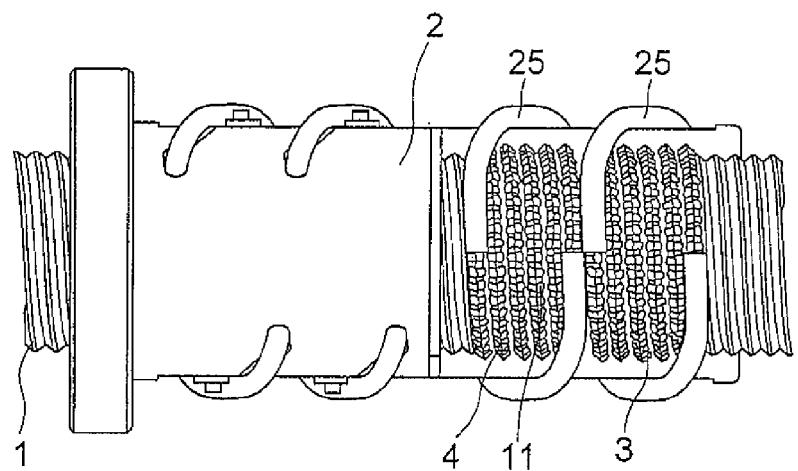
FIG. 19 is a perspective view of a roller screw provided with a circulation path (return pipe type).
Figure 20:
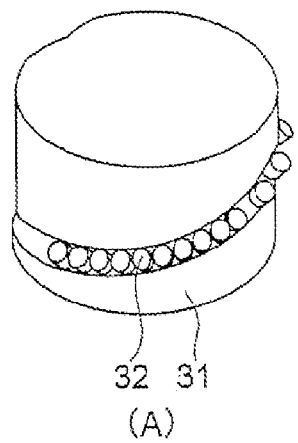
FIGS. 20(A) to 20(D) each illustrates the transition of the rotation axis of a roller arranged in a spiral rolling path with a lead, according to related art, (FIG. 20(A) is a perspective view of rollers in the rolling path, FIG. 20(B) is a perspective view of the transition of the rotation axis, FIG. 20(C) is a front view of the transition of the rotation axis and FIG. 20(D) is a side view of the transition of the rotation axis.
Figure 20:
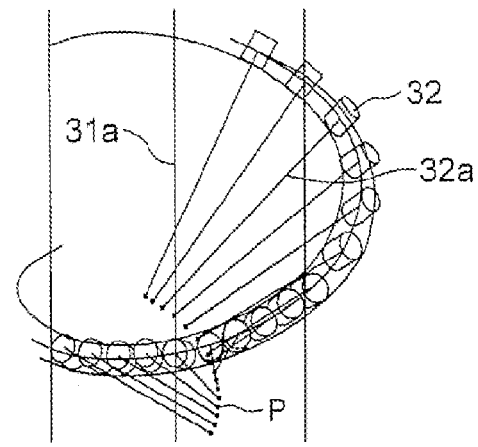
Figure 20:
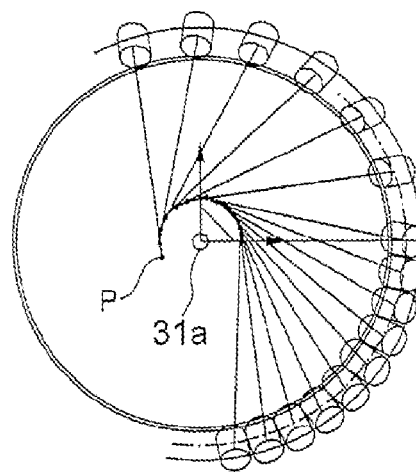
Figure 20:
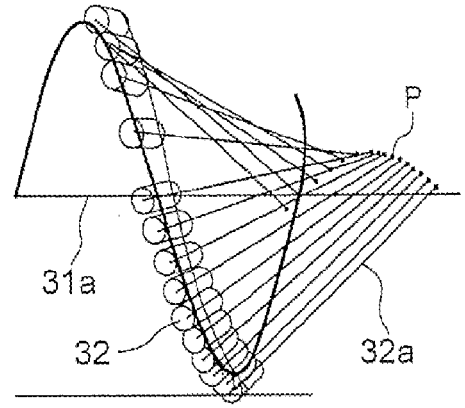

FIG. 19 illustrates another example of the roller circulation path. In this example, a U-shaped return pipe 25 is attached to the nut 2. This return pipe 25 is used to scoop each roller 4 which has rolled from one end of the rolling path 3 to the other end. The return pipe 25 then makes the roller 4 pass through the unloaded return path in the return pipe 25 to return the roller 4 several windings backward to the one end.

The present invention is not limited to the above-described embodiments and may be embodied in other forms without departing from the scope and spirit of this invention. For example, arrangement of rollers is not limited to cross arrangement in which adjacent two rollers are arranged with their axis lines orthogonal to each other and may be parallel arrangement in which adjacent two rollers are arranged with their axis lines parallel to each other. Besides, a roller is not necessarily cylindrical and may be a tapered roller. When the tapered roller is used, it is possible to reduce slips due to a circumference difference between the inner side and the outer side and thereby to allow smooth movement of the roller. Further, the number of threads on the roller rolling surface maybe one, two or three, or any number of threads may be provided on the roller rolling surface.

The present application is based on the Japanese Patent Application No. 2005-065410 filed on Mar. 9, 2005, the entire content of which are expressly incorporated by reference herein.

The invention claimed is:

1. A roller screw comprising:
a screw shaft having a roller rolling surface spirally formed with a lead on an outer surface thereof;
a nut having a roller rolling surface spirally formed on an inner surface thereof to face the roller rolling surface of the screw shaft; and
a plurality of rollers arranged in a rolling path between the roller rolling surface of the screw shaft and the roller rolling surface of the nut and moving around the screw shaft while rotating on respective rotation axes of the rollers, each of the rotation axes of the rollers crossing a center line of the screw shaft.

2. The roller screw according to claim 1, wherein the rollers move around the screw shaft in such a manner that an angle formed by a rotation axis of each of the rollers and a normal extending from a center of the roller to the center line of the screw shaft is kept constant.

3. The roller screw according to claim 1 or 2, wherein each of the rollers is in contact with the roller rolling surface of the screw shaft or the roller rolling surface of the nut at secondary contact lines displaced from an initial contact line in a plane including the rotation axis of the roller and the center line of the screw shaft so as to have the rotation axis of the roller cross the center line of the screw shaft.

4. The roller screw according to claim 1 or 2, wherein each of the rollers has a cylindrical shape.

5. The roller screw according to claim 4, wherein the rollers are cross-arranged in the rolling path in such a manner that the rotation axes of adjacent two of the rollers are orthogonal to each other when seen in a moving direction of the rollers.

6. The roller screw according to claim 4, wherein an axial length L and an outer diameter D of each of the rollers satisfy a relation of $L/D < 1$.

7. The roller screw according to claim 1 or 2, wherein a spacer is provided between each adjacent two of the rollers for supporting attitudes of the rollers to make the rotation axes of the rollers cross the center line of the screw shaft.

8. A roller circulating method of a roller screw having a plurality of rollers arranged in a rolling path between a roller rolling surface spirally formed on an outer surface of a screw shaft and a roller surface spirally formed on an inner surface of a nut to face the roller rolling surface of the screw shaft, the rollers moving around the screw shaft while rotating on respective rotation axes thereof, and each of the rotation axes of the rollers crossing a center line screw shaft.

\* \* \* \* \*